United States Patent [19]

Suzuki et al.

[11] Patent Number: 4,655,549
[45] Date of Patent: Apr. 7, 1987

[54] AUTOMATIC ANTIDAZZLE SEMITRANSPARENT MIRROR

[75] Inventors: Yasutoshi Suzuki, Oobu; Shinya Ohmi, Anjo; Tsuyoshi Fukada, Nagoya; Hiroshi Itoh, Oobu; Kunihiko Hara, Nukata, all of Japan

[73] Assignee: Nippondenso Co., Ltd., Kariya, Japan

[21] Appl. No.: 704,401

[22] Filed: Feb. 22, 1985

[30] Foreign Application Priority Data

Feb. 27, 1984 [JP] Japan .................. 59-35827

[51] Int. Cl.$^4$ .................. G02B 17/00; G02F 1/13; G02F 1/133
[52] U.S. Cl. .................. 350/331 R; 350/279; 350/283; 350/339 R
[58] Field of Search .................. 350/614, 336, 339 R, 350/341, 334, 338, 642, 331 R, 278–283

[56] References Cited

U.S. PATENT DOCUMENTS

| | | | |
|---|---|---|---|
| T940,016 | 11/1975 | Nelson | 350/342 X |
| 2,444,976 | 7/1948 | Brown . | |
| 3,264,267 | 11/1962 | Collins . | |
| 3,542,455 | 11/1970 | Jensen . | |
| 3,592,527 | 7/1971 | Conners | 350/342 |
| 3,600,060 | 2/1971 | Churchill | 350/336 |
| 3,601,614 | 8/1971 | Platzer . | |
| 3,705,310 | 12/1972 | Wild . | |
| 3,787,110 | 1/1974 | Berreman et al. . | |
| 3,862,798 | 1/1975 | Hopkins . | |
| 3,869,196 | 3/1975 | Kubota . | |
| 3,921,162 | 11/1975 | Fukai et al. . | |
| 3,932,026 | 1/1976 | Spokel | 350/339 R |
| 3,944,331 | 3/1976 | Janning | 350/341 |
| 3,961,181 | 6/1976 | Golden . | |
| 3,976,875 | 8/1976 | Engstrom et al. . | |
| 3,986,022 | 10/1976 | Hyatt . | |
| 4,029,393 | 6/1977 | Dungan et al. . | |
| 4,040,727 | 8/1977 | Ketchpel . | |
| 4,095,217 | 6/1978 | Tani et al. | 350/334 X |
| 4,161,653 | 7/1979 | Bedini et al. . | |
| 4,200,361 | 4/1980 | Malvano . | |
| 4,201,451 | 3/1980 | Jacob . | |
| 4,202,607 | 5/1980 | Washizuka et al. | 350/338 |
| 4,229,077 | 10/1980 | Schwab | 350/614 X |
| 4,266,859 | 5/1981 | Togashi . | |
| 4,279,474 | 7/1981 | Belgorod . | |
| 4,342,030 | 7/1982 | Shanks | 350/336 X |
| 4,390,874 | 6/1983 | Woodside . | |
| 4,408,837 | 10/1983 | Kozaki et al. . | |
| 4,491,390 | 1/1985 | Tong-Shen . | |
| 4,499,451 | 2/1985 | Suzuki et al. | 350/283 |
| 4,529,278 | 7/1985 | Nugget . | |
| 4,530,571 | 7/1985 | Conner . | |

FOREIGN PATENT DOCUMENTS

| | | |
|---|---|---|
| 0111907 | 6/1984 | European Pat. Off. . |
| 2416172 | 10/1975 | Fed. Rep. of Germany . |
| 2604462 | 8/1977 | Fed. Rep. of Germany . |
| 2732727 | 3/1978 | Fed. Rep. of Germany ... 350/331 R |
| 2808260 | 8/1979 | Fed. Rep. of Germany . |
| 2111683 | 6/1972 | France .................. 350/642 |
| 0040348 | 3/1977 | Japan .................. 350/642 |
| 0039845 | 3/1980 | Japan . |
| 0004003 | 1/1982 | Japan .................. 350/641 |
| 0102603 | 6/1982 | Japan .................. 350/331 R |
| 490516 | 10/1937 | United Kingdom . |
| 2029343 | 3/1980 | United Kingdom . |

OTHER PUBLICATIONS

Journal of Applied Physics, Japan–vol. 29, No. 3 (Optics Special Number 16) Published by The Society of Applied Physics, Japan–pp. 139-149.

*Primary Examiner*—John K. Corbin
*Assistant Examiner*—David Lewis
*Attorney, Agent, or Firm*—Cushman, Darby & Cushman

[57] ABSTRACT

A reflection mirror using a liquid crystal cell is disclosed. A first thin film consisting of one of magnesium difluoride, silicon dioxide, silicon monoxide or titanium dioxide is formed on a glass substrate supporting the liquid crystal cell and a thin aluminum film is formed on the first thin film as a reflection mirror layer. Adhesiveness of the thin aluminum film to the glass substrate is strengthened by the first thin film. A second thin film is formed on the thin aluminum film to protect the same from being hurt. The reflection mirror may be used as a dazzle-free reflection mirror of an automotive vehicle.

7 Claims, 8 Drawing Figures

AUTOMATIC ANTIDAZZLE SEMITRANSPARENT MIRROR

RELATED APPLICATIONS

The following listed applications (including this one) are related in that they pertain to the same general art (dazzle-free mirrors). However, each of the applications specifically pertains to and claims different aspects of that general art. There is a line of demarcation among the claims of all of these applications: ITOH et al, Ser. No. 670,015, filed Nov. 9, 1984; ITOH et al, Ser. No. 616,185, filed June 1, 1984; ITO et al, Ser. No. 593,946 filed Mar. 27, 1984; OHMI et al, Ser. No. 671,612 filed Nov. 15, 1984; ITOH et al, Ser. No. 701,224, filed Feb. 13, 1985; and SUZUKI et al, Ser. No. 704,401, filed Feb. 22, 1985.

BACKGROUND OF THE INVENTION

The present invention relates to a reflection mirror which electrically controls reflectivity or transmittivity of light thereof by the use of a liquid crystal.

The reflection mirror may be used as an interior room mirror, exterior side mirror or the like of an automotive vehicle.

In a conventional reflection mirror, chrome has been vapor-deposited on a rear surface of a glass substrate to form a reflection film. Reflectivity of light of the conventional reflection mirror with the chrome film, however, could be increased at most to about 50% even if the chrome film is thickened enough.

It has been suggested to increase the reflectivity of light to as high as 80%–90%, for instance, by the use of aluminum. It was disadvantageous, however, that aluminum film peels off because of insufficient adhesiveness thereof to the glass substrate when aluminum is vapor-deposited directly on the glass substrate.

To overcome the disadvantage, it has been suggested in the Japanese publication, "Journal of Applied Physics, vol. 29, No. 3, page 141", that chromel be used between the glass substrate and the aluminum film to improve adhesiveness of the aluminum film to the glass substrate.

It was still disadvantageous, however, in the following points. (1) Total reflectivity of light cannot be increased sufficiently high even if the aluminum film is formed on the chromel film, since reflectivity and transmittivity of light of chromel is low as chrome is. (2) Chromel cannot be vapor-deposited on a liquid crystal cell since, when chromel is vapor-deposited on a rear surface of the glass substrate used to support the liquid crystal cell in which a pair of transparent electrodes, a pair of orientation film sand a liquid crystal, the orientation of the orientation films is disturbed by the temperature at the vapor-depositing.

The second disadvantage (2) is explained hereinunder in more detail. The reflection mirror using the liquid crystal cell used as a dazzle-free interior room mirror of an automotive vehicle, for instance, is manufactured in general in a series of processes shown in FIG. 8.

Firstly, at a step 100, soda glass is cut in a shape of transparent glass substrate. At a step 102, a transparent conductive film is formed on the glass substrate as an electrode. The transparent conductive films used indium tin oxides in which weight percentage ratio between $In_2O_3$ and $SnO_2$ is 95:5 and are formed to film thickness of 1000 Å by an electron beam under 350° C.–400° C. and oxygen partial pressure of $1 \times 10^{-2} Pa - 5 \times 10^{-2} Pa$. Next, at a step 104, acid-resistant resist ink is printed on the transparent conductive film over a whole range corresponding to a dazzle-free portion so that a masking is provided. At a step 106 thereafter, the substrate with the transparent conductive film is dipped for two minutes under temperature of 45° C. in a fluid solution mixture of concentrated hydrochloric acid and water in 1:1 ratio so that surrounding portions of the transparent conductive film corresponding to a sealing portion is removed therefrom. At a step 108, the resist ink is removed by the use of organic solvent, trichloroethylene. Then, at a step 110, orientating processing is done to orient the liquid crystal parallelly. In the orientating processing, polyimide solution is slushed by a spinner at 3500 rpm and thereafter the substrate is maintained at temperatures of 300° C. for 30 minutes and 400° C. for 30 minutes and fired thereby to form an orientation film on the conductive film. Then rubbing the orientation film is done by the use of chemical fiber cloth to provide orientation of liquid crystal filled in later. At a step 112, sealing material is printed on side portions by the use of epoxy resin. Further, at a step 114, glass fiber particles in particle diameter of 10 μm are spread as spacers on the orientation film. At a step 116, a pair of glass substrates each being processed as abovedescribed are put one upon another in parallel and maintained under temperature of 100° C. for 2 hours for bonding so that a liquid crystal cell is provided. At a step 118, a reflection film is vapor-deposited on the other end surface of one of the transparent glass substrates to form a mirror surface thereat. At a step 120, liquid crystal is filled in an inner space of the liquid crystal cell by a decompressed injection process. At a step 122, an injection opening is sealed with epoxy adhesive.

As described above, forming the mirror surface is done after the orientating process. This is for the reason that, if forming the mirror surface is done before the orientation process, the mirror surface formed beforehand might be hurt in later processes such as the orientating process, it might be hurt when the glass substrate is attached to holding jigs for the orientating process, for instance, and the mirror surface might become uneven. Therefore, forming the mirror surface must be done after the orientating process.

Here, it has been found experimentally that, when the liquid crystal cell obtained after the orientating process is heated to above 160° C., the orientation is disturbed. This means that temperature of the substrate must be maintained below 160° C. at least in the process of forming the mirror surface. In the case of forming the mirror surface of metals such as chrome, chromel of alumiunumby vapor-depositing in a vacuum, however, it is generally considered to heat the substrate to temperature as high as 200° C.–300° C. so that adhesiveness of the metal film to the substrate is increased. Therefore, the abovedescribed metals cannot be used for forming the mirror surface in the case of the reflection mirror using the liquid crystal cell in which the mirror surface must be formed below temperature of 160° C.

SUMMARY OF THE INVENTION

It is an object of the invention to provide a reflection mirror using a liquid crystal cell in which aluminum is used for a reflection film forming a mirror surface and is adhered to a glass substrate for supporting the liquid crystal cell without influencing the liquid crystal cell.

According to the present invention, adhesiveness of an aluminum film to a glass substrate is improved by using one of magnesium difluoride, silicon dioxide, silicon monoxide or titan dioxide between the aluminum film and the glass substrate.

DETAILED DESCRIPTION OF THE PREFERRED EMBODIMENTS

The present invention will be described with reference to various embodiments. In the described embodiments, a reflection mirror is used as a dazzle-free reflection mirror of an automotive vehicle. Of course, other uses come within the scope of the invention as defined by the claims.

Figure 1:
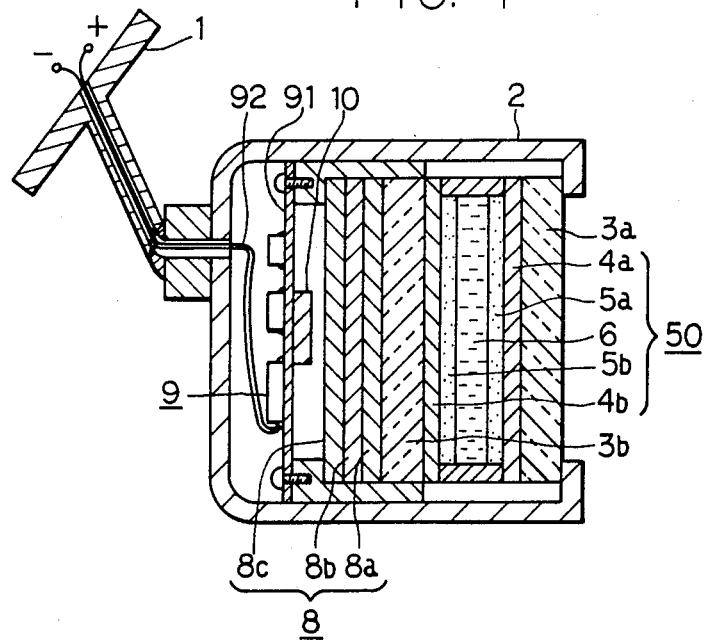
FIG. 1 is a cross-sectional view showing a reflection mirror according to a first embodiment of the present invention.
Figure 8:
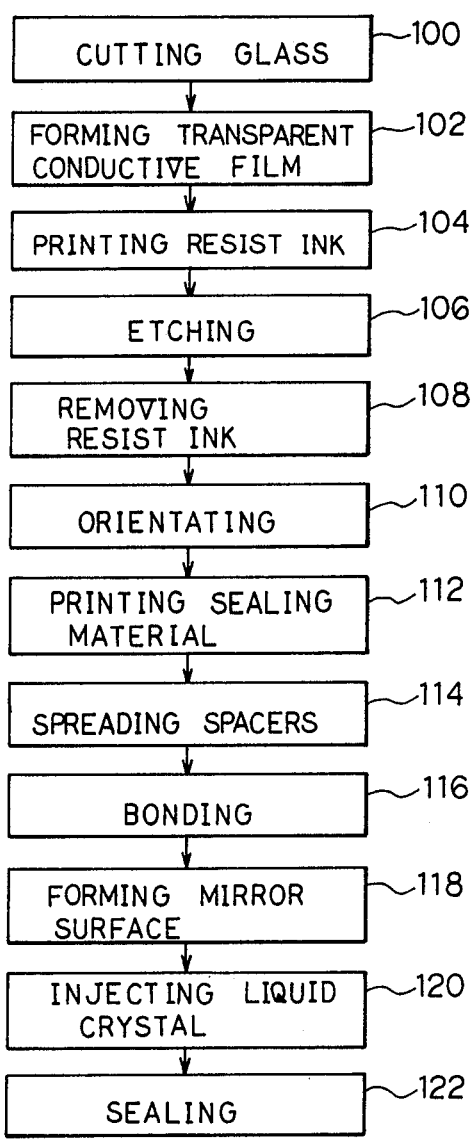
FIG. 8 is a flow chart showing a series of prior art processing steps for manufacturing the reflection mirror.

FIG. 1 is a cross-sectional view showing the structure of the dazzle-free reflection mirror according to the first embodiment of the present invention. The reflection mirror primarily comprises an attachment 1 for attaching the reflection mirror to a vehicle ceiling (not shown), a light-shielding frame body 2 supported by the attachment 1, a pair of glass substrates 3a and 3b, a liquid crystal cell 50 sandwiched between the glass substrates 3a and 3b for controlling the transmittivity of light, a semitransparent or half mirror 8, a photo diode 10 for detecting intensity of light incident thereto and a driving circuit 9 supported within the frame body 2 for driving the liquid crystal cell 50 in accordance with the detected intensity of light. It should be noted here that the liquid crystal cell 50 and the semitransparent mirror 8 could be manufactured in a conventional method shown in FIG. 8.

The photo diode 10 is provided behind the semitransparent mirror 8 as a photo sensor for detecting the light having passed through the liquid crystal cell 50 and the semitransparent mirror 8. The photo diode 10 is supported on a substrate 91 supporting the driving circuit 9 thereon. The driving circuit 9 is supplied with the electric power from a battery mounted on the automotive vehicle through power supply cables 92.

The liquid crystal cell 50 sandwiched between the glass substrates 3a and 3b has, as seen from the light incident side or front side, a transparent electrode layer 4a consisting of ITO (Indium Tin Oxide), an orientation film 5a for orientating liquid crystal parallelly, a liquid crystal layer 6 consisting of the nematic liquid crystal for generating DSM (Dynamic Scattering Mode), an orientation film 55b and a transparent electrode layer 4b. The liquid crystal cell 50 is structured to generate dynamic scattering upon an application of an electric voltage across the electrodes 4a and 4b and control the transmittivity of light incident from the glass substrate 3a therethrough so that the total reflectivity of light of the whole reflection mirror is electrically controlled. Thickness of the transparent electrode layers 4a and 4b was set to 1000 Å whereas thickness of the liquid crystal layer 6 was set to 10 μm.

The half mirror 8 which is manufactured at the step 118 has a first transparent thin film layer 8a formed on the rear side surface of the glass substrate 3b, a thin semitransparent reflection layer 8b and a second transparent thin film layer 8c. The first thin film layer 8a was formed by vapor-depositing magnesium difluoride ($MgF_2$) to the thickness of 1300 Å by the electron beam under substrate temperature of 150° C. The semitransparent reflection layer 8b was formed by vapor-depositing aluminum to the thickness of 350 Å under substrate temperature of 150° C. The second thin film layer 8c was formed by vapor-depositing magnesium difluoride ($MgF_2$) to the thickness of 700 Å under substrate temperature of 150° C. The semitransparent mirror 8 manufactured in the above-described manner had 55% in reflectivity of light and 8% in transmittivity of light. This transmittivity of light is higher by 8 times than the transmittivity 1% of chrome. The adhesiveness of aluminum to the glass substrate 3b is increased and, since the surface thereof is protected by the second thin film layer 8c, it is prevented from peeling off and being hurt.

Figure 2:
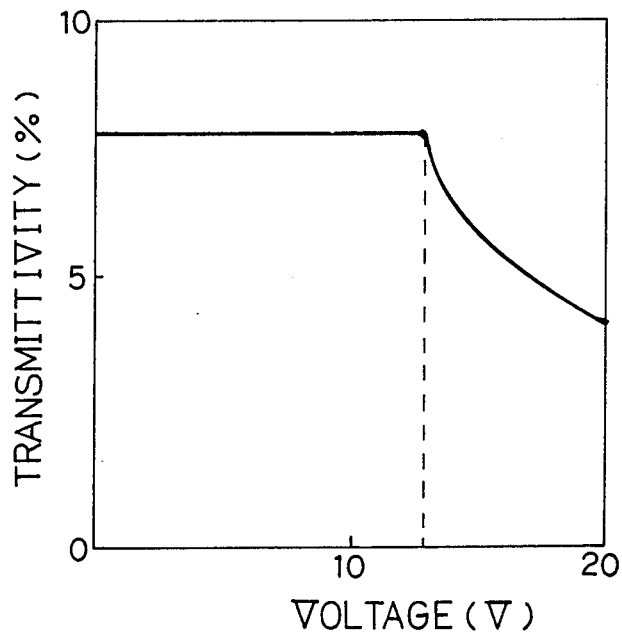
FIG. 2 is a graph showing a relation between a voltage applied to a liquid crystal cell and a transmittivity of light having passed reflection mirror according to the first embodiment.

FIG. 2 is a graph showing a relation between the voltage applied to the liquid crystal cell 50 and the transmittivity of light measured by detecting the light having passed through the semitransparent mirror 8 in the dazzle-free reflection mirror according to the first embodiment. As will be understood from the graph, the transmittivity of light of the liquid crystal is at the maximum value and the rate of light passing through the semitransparent mirror 8 is at about 8%, when no voltage is applied. It will be also understood that, with the voltage of about 20 volts, the transmittivity of light is decreased to 4% because of the dynamic scattering effect which changes the transmittivity of light passing through the semitransparent mirror 8.

Figure 5:
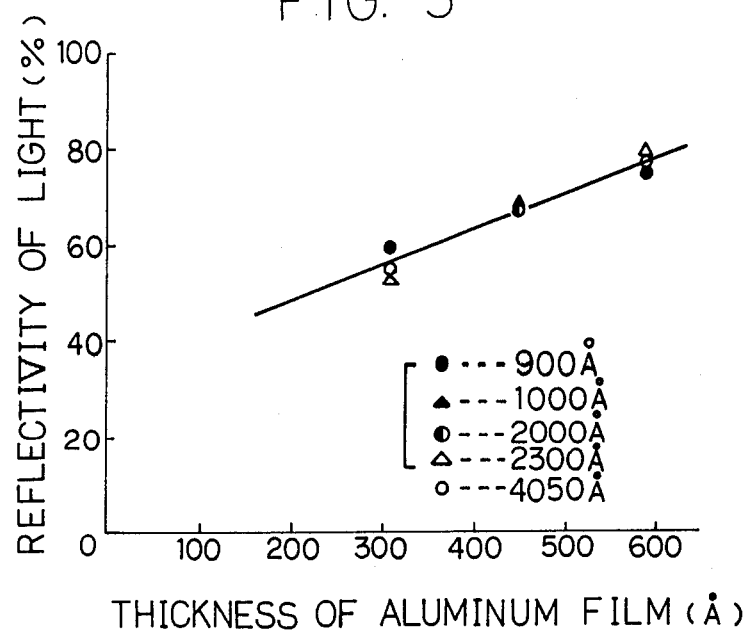
FIG. 5 is a graph showing relations between thickness of aluminum film and reflectivity of light of the reflection mirror according to the first embodiment.

To evaluate the influence of the thickness of the first thin film layer 8a on the reflectivity of light, the first thin film layer 8a and the semitransparent reflection layer 8b were varied in the first embodiment. The result of the experiment is shown in FIG. 5 in which the reflectivity of light of the reflection mirror is plotted with respect to the thickness of the semitransparent reflection layer 8b with the thickness of the first thin film layer 8a as a parameter. As will be understood from FIG. 5, the thickness of the first thin film layer 8a had no substantial influence on the reflectivity of light. This means that the reflectivity of light is substantially dependent only on the thickness of the semitransparent reflection layer 8b.

It was also confirmed that substantially the same result as in the abovedescribed first embodiment could be obtained when magnesium difluoride ($MgF_2$) used for the first and second thin film layers 8a and 8c was replaced by silicon dioxide (SiO$_2$), silicon monoxide (SiO) or titanium dioxide (TiO$_2$).

Figure 3:
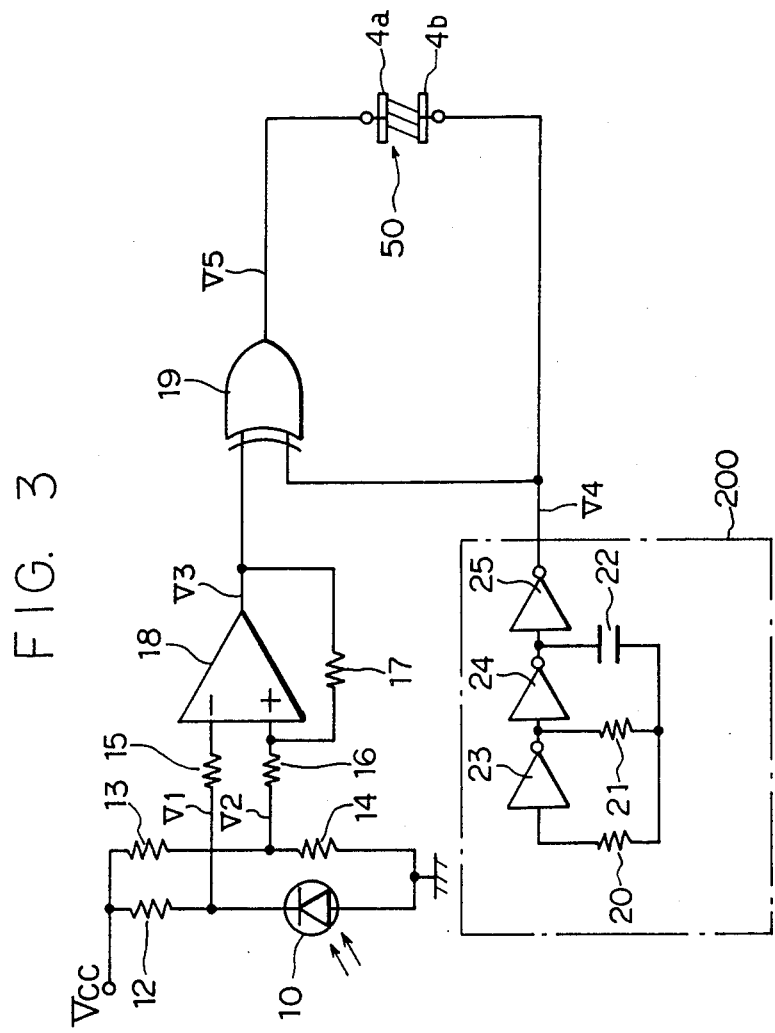
FIG. 3 is a circuit diagram showing a driving circuit for the reflection mirror according to the first embodiment.

FIG. 3 is an electric wiring diagram showing the driving circuit 9 used in the first embodiment. In view of the fact that the intensity of light detected by the photo diode 10 differs in dependence on whether dazzling of light is prevented or not, the intensity of light detected at the time of preventing dazzling of light becomes lower than that detected at the time of not preventing dazzling of light and, therefore, it is necessary to change a switching point of the driving circuit for driving the liquid crystal cell 50.

As shown in FIG. 3, an inverting input terminal of a comparator 18 is connected to receive, as a detection voltage, a voltage V1 at a connection between a resistor 12 and the photo diode 10. A non-inverting input terminal of the comparator 18 is connected to receive, as a reference voltage, a voltage V2 produced by dividing the battery voltage Vcc by a resistor 13 and a resistor 14. On the other hand, a positive feedback resistor 17 is connected between the non-inverting input terminal and an output terminal of the comparator 18. The positive feedback resistor 17 is used, as is known well with respect to the operation of comparators, to provide a hysteresis characteristic so that the switching point thereof is changed. The output terminal of the comparator 18 is connected to an exclusive-OR circuit 19 and an output terminal of the latter is connected to the transparent electrode 4a of the liquid crystal cell 50. On the other hand, an output terminal of a pulse oscillator 200 is applied to the exclusive-OR circuit 19. The output terminal of the pulse oscillator 200 is connected also to the transparent electrode 4b of the liquid crystal cell 50. The pulse oscillator 200 comprises C-MOS inverters 23, 24 and 25, resistors 20 and 21 and a capacitor 22 which determine an oscillation frequency.

Operation of the driving circuit 9 shown in FIG. 3 is described with reference to a timing chart of FIG. 4. The reference voltage V2 of the comparator 18 is set at the low and high voltages Vt2 and Vt1 in response to the low and high levels of an output voltage V3 of the comparator 18, respectively. When the intensity of the light incident to the photo diode 10 increases gradually as shown in (a) of FIG. 4, the voltage V1 responsively decreases as shown in (b) of FIG. 4 and reaches the reference voltage Vt2 at a time t1. Then, as shown in (c) of FIG. 4, the output voltage V3 of the comparator 18 becomes high at the time t1. With this high level voltage V3, the reference voltage V2 is set at Vt1. Dynamic scattering is generated with the alternating current voltage being applied to the liquid crystal cell 50 as described later and, as a result, the intensity of the incident light detected by the photo diode 10 decreases by an amount Δ as shown in (a) of FIG. 4. Therefore, although the voltage V1 increases correspondingly, it does not reach the level of reference voltage Vt1. Thus, the output voltage V3 of the comparator 18 is maintained high until the time t2.

Figure 4:
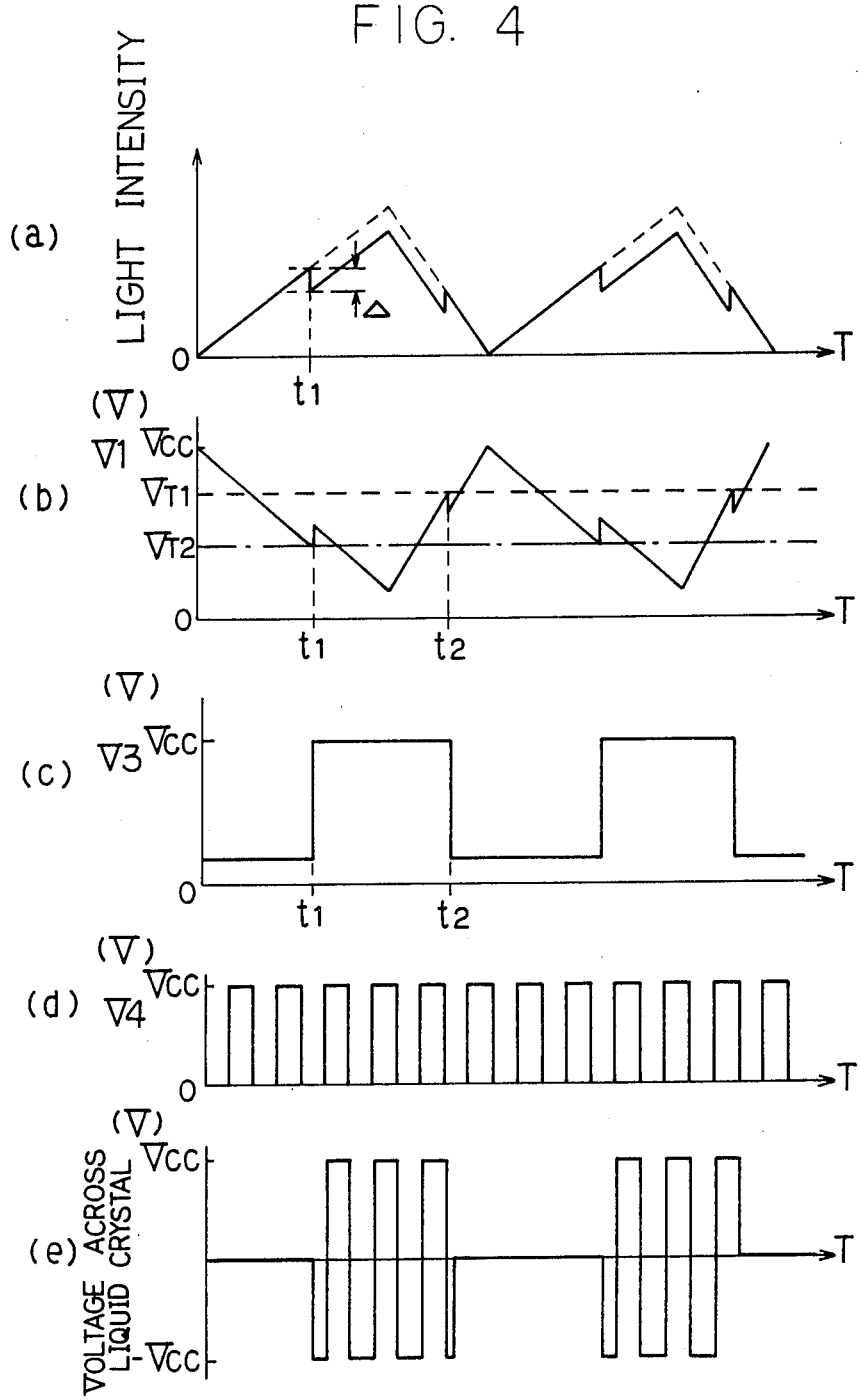
FIG. 4 is a timing chart showing waveforms of signals produced in the driving circuit shown in FIG. 3.

The pulse oscillator 200 produces, as shown in (d) of FIG. 4, an output voltage V4 in a rectangular waveform at a fixed frequency. Accordingly the voltages V5 and V4 applied to the electrodes 4a and 4b of the liquid crystal cell 50 are in an opposite phase relation to each other by means of the exclusive-OR circuit 19 only when the voltage V3 is at the high level, and the voltage applied across the liquid crystal cell 50 changes as shown in (e) of FIG. 4. This means that the liquid crystal cell is driven into the dazzle-free mode during the time period t1-t2 by the alternating current voltage. The time t2 indicates the time when the voltage V1 produced by the photo diode 10 reaches the reference voltage Vt1 due to decrease in the intensity of light incident to the reflection mirror, that is, the time when the dazzle-free mode is terminated.

Figure 6:
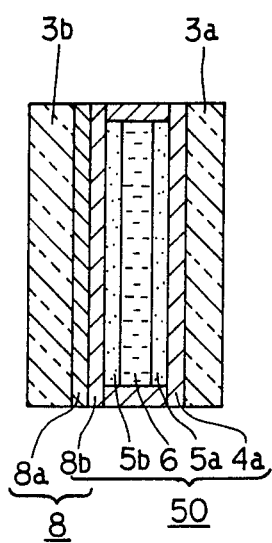
FIG. 6 is a cross-sectional view showing partly a reflection mirror according to a second embodiment of the present invention.
Figure 7:
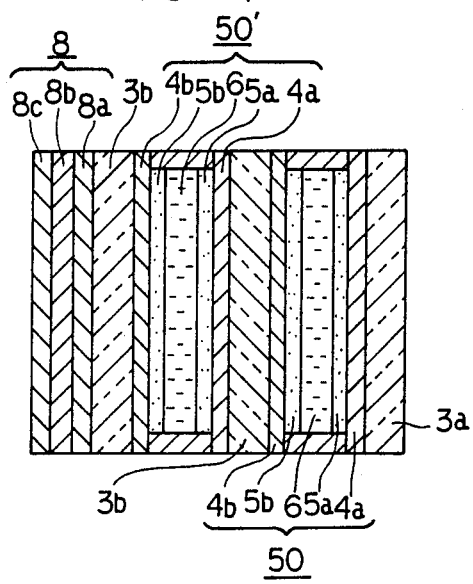
FIG. 7 is a cross-sectional view showing partly a reflection mirror according to a third embodiment of the present invention.

A second and third embodiments of the reflection mirror are shown in FIGS. 6 and 7, respectively, in which same reference numerals are used to designate the same or similar parts as in the first embodiment shown in FIG. 1.

In the second embodiment shown in FIG. 6, the first thin film layer 8a is formed on the front side surface of the glass substrate 3b and the semitransparent reflection layer 8b is formed on the first thin film layer 8a so that the semitransparent reflection layer 8a functions as one of the electrodes of the liquid crystal cell 50 as well.

In the third embodiment shown in FIG. 7, a pair of liquid crystal cells 50 and 50' are stacked to each other to form a guest/host liquid crystal cell and the semitransparent mirror 8 are formed on the rear side surface of the glass substrate 3b of the liquid crystal cell 50' in the same manner as in the first embodiment shown in FIG. 1.

According to the present invention described hereinabove, capability of vapor-depositing aluminum is increased and peeling off is prevented by virtue of the first thin film layer. Further, by virtue of a second thin film layer, hurting an aluminum film surface is prevented. The sensitivity in detecting a dazzle-free condition is increased and the reflection image in the dazzle-free condition becomes more clear with the semitransparent mirror layer being used for the dazzle-free reflection mirror.

What we claim is:

1. A reflection mirror comprising:
    a glass substrate;
    a liquid crystal cell supported on said glass substrate for changing transmittivity of light incident thereto in accordance with an electric voltage applied thereto;
    a first thin film formed on said glass substrate and consisting of one of magnesium difluoride, silicon dioxide, silicon monoxide or titanium dioxide;
    a thin aluminum film on said first thin film forming a semitransparent mirror surface which transmits a portion of and reflects a portion of the light incident thereto through said liquid crystal cell;
    a photo sensor positioned behind said thin aluminum film for detecting an intensity of the light incident thereto through said liquid crystal cell and said thin aluminum film;
    a driving circuit connected to said photo sensor for applying said electric voltage to said liquid crystal cell in accordance with the intensity of the light detected by said photo sensor; and
    a light shielding body encasing therein said glass substrate, said liquid crystal cell, said first thin film, said thin aluminum film and said photo sensor.

2. A reflection mirror according to claim 1, wherein said liquid crystal cell includes a liquid crystal layer and a pair of orientation films sandwiching said liquid crystal layer therebetween and is positioned adjacent to said thin aluminum film so that said liquid crystal cell is applied with said electric voltage through said thin aluminum film.

3. A reflection mirror according to claim 1, wherein said liquid crystal cell is positioned adjacent to one side surface of said glass substrate and said first thin film is formed on the other side surface of said glass substrate.

4. A reflection mirror according to claim 3, wherein said liquid crystal cell includes a liquid crystal layer, a pair of orientation films sandwiching and liquid crystal layer therebetween and a pair of electrode films sandwiching said orientation films therebetween.

5. A reflection mirror according to claim 3 further comprising a second thin film formed on said thin aluminum film for protecting said thin aluminum film and consisting of one of magnesium difluoride, silicon dioxide, silicon monoxide or titanium dioxide.

6. A reflection mirror according to claim 1, wherein said driving circuit includes:
   means for comparing the detected intensity of light with a reference level and producing a first and second output indicative of the detected intensity of light being higher and lower than the reference level, respectively;
   means for applying said electric voltage to said liquid crystal cell in response to the first output of said comparing means; and
   means for increasing and decreasing the reference level in response to the second output and the first output of said comparing means.

7. A reflection mirror for a vehicle comprising:
   a light shielding frame body attached to a vehicle body and having an opening therein;
   a glass substrate provided within said frame body;
   a thin intermediate film formed on said glass substrate opposite to said opening of said frame body and consisting of one of magnesium difluoride or titanium dioxide;
   a thin semitransparent metal film formed on said intermediate film for reflecting and passing therethrough the light incident thereto through said opening of said frame body;
   a photo sensor positioned behind said metal film within said frame body for detecting an intensity of light passed through said metal film;
   an electric circuit connected to said photo sensor for determining a desired reflectivity of light at said metal film in accordance with the detected intensity of light; and
   means provided within said frame body and driven by said electric circuit for adjusting the reflectivity of light to the desired reflectivity determined by said electric circuit.

* * * * *